Sept. 4, 1923.
S. H. SHARPSTEEN
MOTOR DRIVEN CIRCUIT CARRIAGE
Original Filed Aug. 2, 1920      3 Sheets-Sheet 1
1,467,253
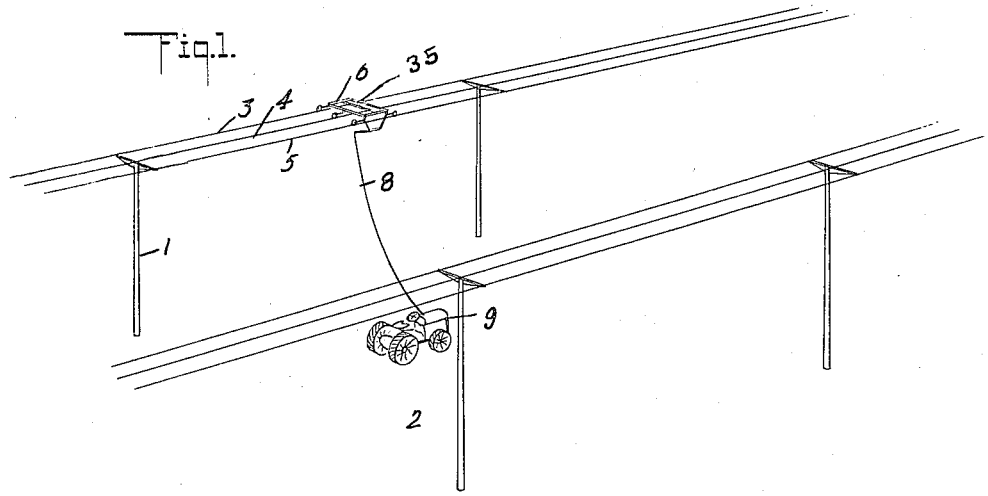
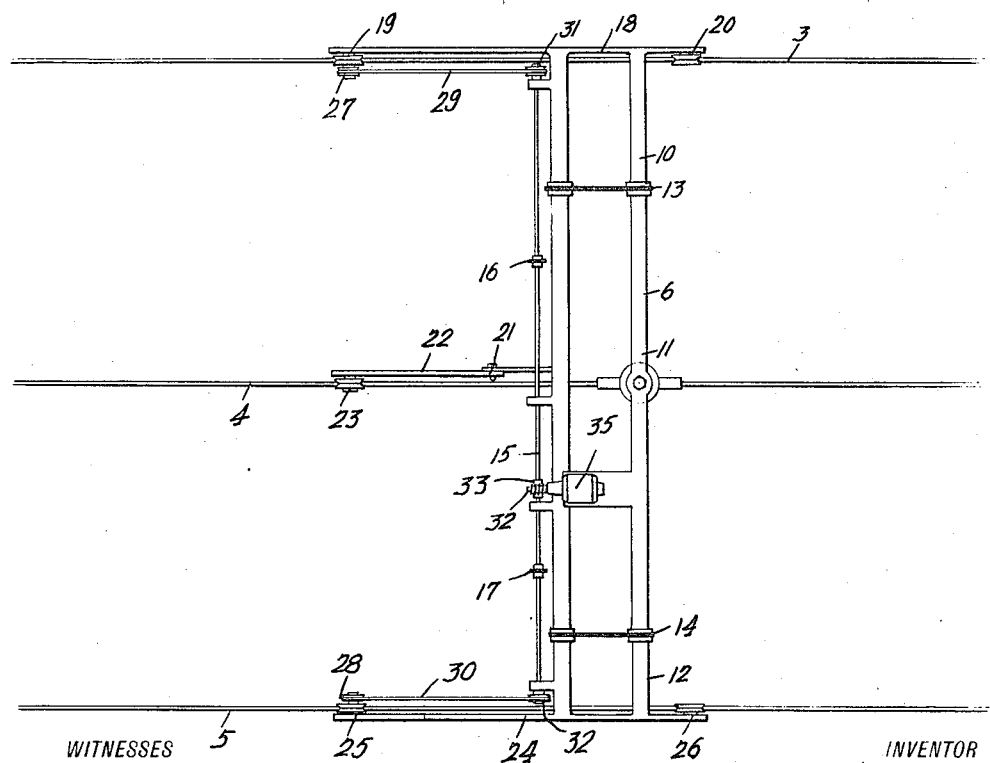
WITNESSES
INVENTOR
STEPHEN H. SHARPSTEEN
BY
ATTORNEYS Sept. 4, 1923.
S. H. SHARPSTEEN
1,467,253
MOTOR DRIVEN CIRCUIT CARRIAGE
Original Filed Aug. 2, 1920    3 Sheets-Sheet 2
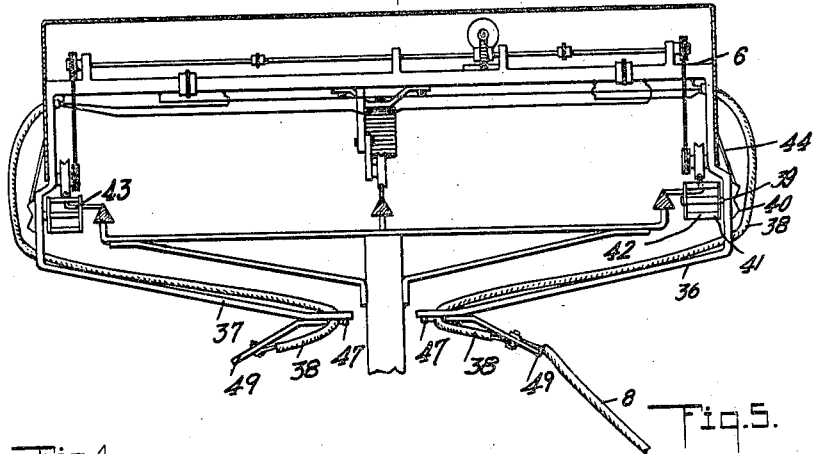
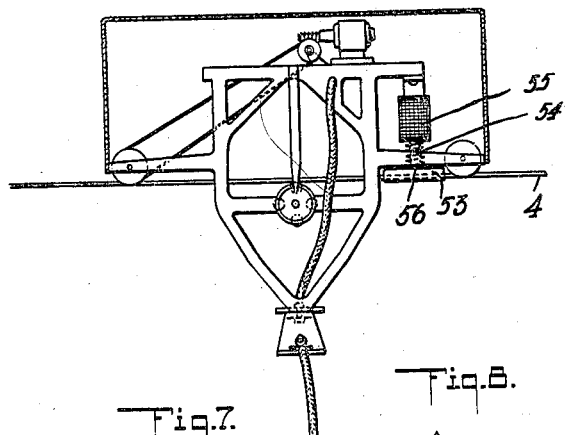
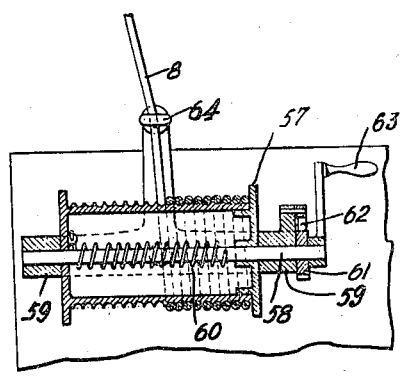
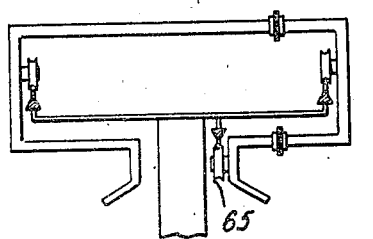
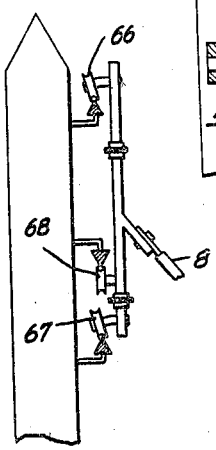
WITNESSES
INVENTOR
STEPHEN H. SHARPSTEEN
BY
ATTORNEYS Sept. 4, 1923.  1,467,253
S. H. SHARPSTEEN
MOTOR DRIVEN CIRCUIT CARRIAGE
Original Filed Aug. 2, 1920    3 Sheets-Sheet 3

WITNESSES
Frederick Kiehl.
A. L. Kitchin

INVENTOR
STEPHEN H. SHARPSTEEN
BY
ATTORNEYS

Patented Sept. 4, 1923.

1,467,253

UNITED STATES PATENT OFFICE.

STEPHEN H. SHARPSTEEN, OF TENAFLY, NEW JERSEY.

MOTOR-DRIVEN CIRCUIT CARRIAGE.

Application filed August 2, 1920, Serial No. 400,769. Renewed February 15, 1923.

*To all whom it may concern:*

Be it known that I, STEPHEN H. SHARP-STEEN, a citizen of the United States, and a resident of Tenafly, in the county of Bergen and State of New Jersey, have invented a new and useful Motor-Driven Circuit Carriage, of which the following is a full, clear, and exact description.

This invention relates to electrical distribution, and particularly to means for distributing the same through a travelling member to a second travelling member, and has for an object to provide an improved construction wherein the electrical current may be supplied in any quantity at a minimum cost and over a maximum area.

Another object of the invention is to provide means for distributing current to vehicles in which the connecting member connecting the conductors with the travelling vehicles also moves substantially at the same rate as the vehicle.

A still further object of the invention is to provide a system of distribution of current on farms, factory yards, roads and other places with an arrangement whereby the connection is movable and in which the vehicle or other device utilizing the current is permitted independent movement in any direction.

An additional object is to provide a travelling carriage automatically driven and provided with means for automatically turning on and off the current in order that the carriage may substantially keep pace with a vehicle to which it may be connected.

In the accompanying drawings:

Figure 1 is a perspective view of a field showing a motor driven tractor and means for supplying current thereto as it travels across the field.

Figure 2 is a top plan view of the circuit carriage shown in Figure 1 together with the wires for supporting the same, said carriage and wires being shown on an enlarged scale.

Figure 3 is a front view of the carriage, wires and associate parts shown in Figure 2.

Figure 4 is an end view of the carriage shown in Figure 3.

Figure 5 is an enlarged side view of a conductor connection embodying certain features of the invention.

Figure 6 is a sectional view through a wheel embodying certain features of the invention.

Figure 7 is a view similar to Figure 3, but showing a modified form of the invention.

Figure 8 is a front view in outline showing a second modified form of the invention.

Figure 9:
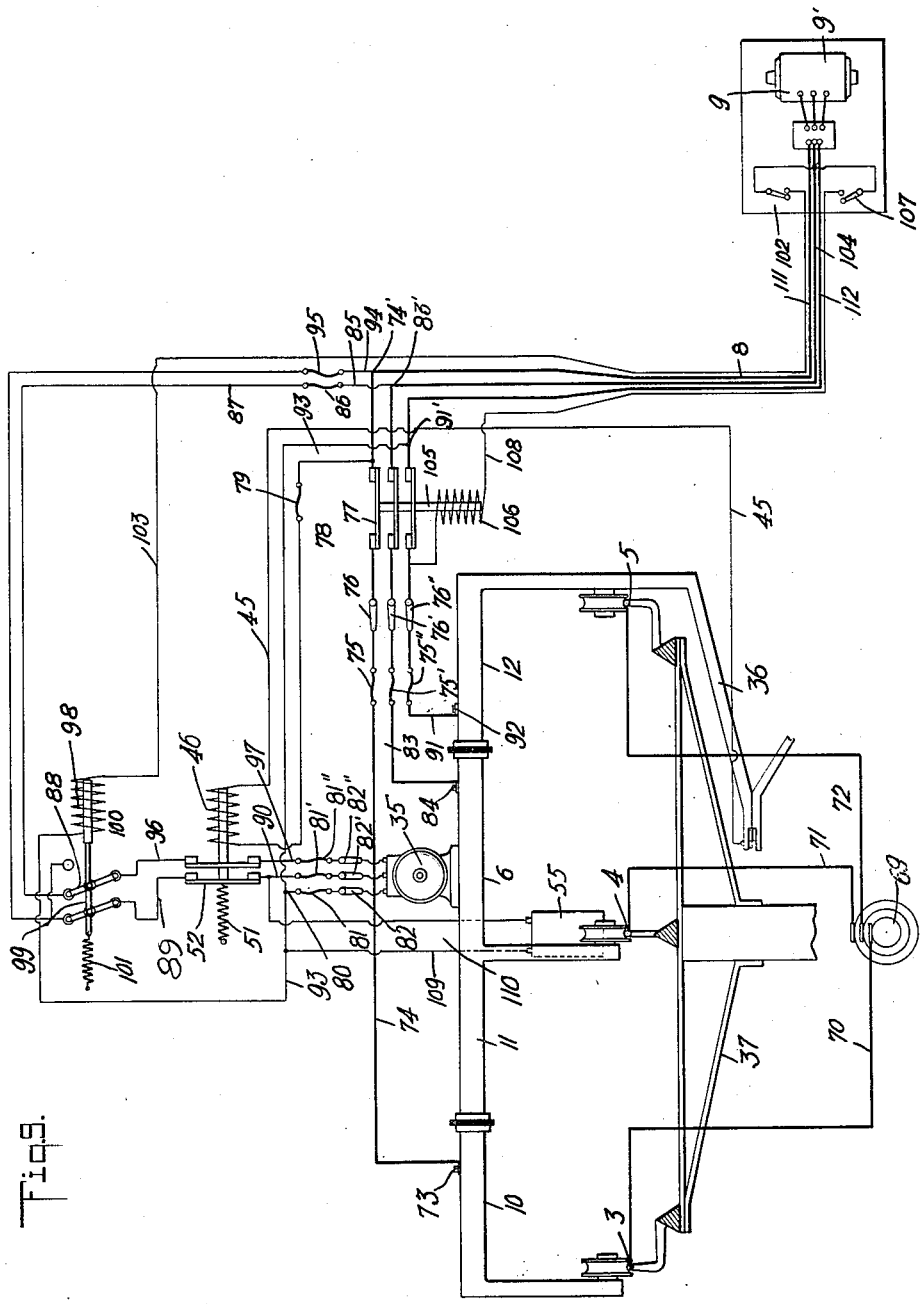
Figure 9 is a diagram showing the circuits utilized in the construction shown in Figure 1.

In distributing electricity some form of conductor must be provided, and where the distribution is to electric cars a trolley is usually provided with a sliding or rolling contact carried by an arm of some kind. The relation between the trolley and the conductor is always the same. Where the distribution is made to stationary motors or other vehicles utilizing current a connection is provided usually by a system of wiring which presents the proper circuits. In some instances, however, either form of distribution just mentioned would not operate properly, as for instance in a factory yard where an electric vehicle was to be moved around freely over a given surface without the use of tracks and moved in any direction, also is providing an electrical engine for farm use the above form of distribution would be impractical. The present invention is aimed to provide a special form of distribution with certain forms of apparatus which will permit the use of electrical energy for driving tractors or vehicles of any kind around a farm or around a factory yard in any direction desired and yet be continually connected with a source of power. In carrying out this idea distributing wires are provided above or adjacent the roads of a farm and also at spaced intervals across the various fields of a farm. These cables or trolley wires may be arranged to receive either direct current or alternating current of any phase. On these wires are arranged one or more carriages, which carriages are self-propelled, and to which supply cables may be connected, which are in turn connected to the vehicles which are to be supplied with current.

In addition to using the distributing system on farms and along roads it may be used in a large number of other cases as for instance lakes, rivers or canals where current could be provided for the vessels or boats. On canals particularly the system would easily furnish ample power for as many boats as the canal could accommodate and cause the boats to be propelled at a maximum speed permitted by the conditions of the canal and other surrounding circumstances.

Various details may be provided for carrying out this form of distribution, but in order to show one practical embodiment of the inventive idea a particular construction has been illustrated in the drawings to which reference is now made. As shown in Figure 1 several rows of poles 1 are provided in the field 2, and each row is provided with wires 3, 4 and 5 for supplying a three phase current from a suitable generator. If desired, one or two wires could be used as well as three without departing from the spirit of the invention and also direct current could be used or current having more or less than three phases. It will, therefore, be understood that when the term wires or conductors are used that it will mean one or more wires or other conductors which will act to carry out the inventive idea of supporting a carriage and supplying current thereto and also to a distributing wire or other conductor connected with the carriage. On wires or conductors 3, 4 and 5 is arranged a carriage 6 which is provided with an electric motor 35 and other parts hereinafter fully described for propelling the carriage along the wires. A cable 8 is connected with the carriage 6 and is made of any desired or particular length and connected to a suitable reel hereinafter fully described, and with a tractor 9, which tractor is steerable in the usual manner and consequently may be moved in any desired direction over the field 2. Ordinarily, however, the tractor 9 moves parallel with wires 3, 4 and 5 for plowing or working the land in any desired manner. It is, of course, understood the tractor 9 is provided with an electric motor acting as a prime mover and the tractor may be of any construction and may pull any desired device across the field 2. The motor 7 of the carriage 6 is constructed to travel at substantially the same speed as the tractor 9 so that both the tractor and the carriage move together. In case the carriage 6 should travel too fast means are provided, which are hereinafter fully described, for opening the circuit of the motor 7 whereby the carriage 6 will wait until the tractor 9 approaches the carriage whereby the circuit is again reestablished and the carriage then moves ahead.

The carriage 6 is shown in detail in Figures 2 to 4 inclusive, and from an examination of these figures it will be seen that the carriage is divided into three sections namely, sections 10, 11 and 12, said sections being insulated by insulating members 13 and 14. A driving rod 15 is carried by the carriage 6 by suitable brackets, and said driving rod is also divided into three parts, but rigidly connected together by insulating members 16 and 17. This arrangement of insulation of the carriage may be widely modified, but is believed to be desirable as it will tend to prevent any short circuiting on the carriage in case any wheel or wheels leave the trolley wire. Section 10 is provided with a side section 18 on which are pivotally mounted trolley wheels 19 and 20, said trolley wheels resting on the wire 3. Section 11 is provided with a forward extension or bracket 21 to which the arm 22 is pivotally connected, said arm carrying the trolley wheel 23 resting on the cable 4. Section 12 is provided with an end 24 on which trolley wheels 25 and 26 are rotatably mounted, said trolley wheels resting on the cable 5 for properly supporting the carriage in co-operation with the trolley wheels 19 and 20. These trolley wheels and the carriage are all preferably made from metal so that a proper contact and conductor will be continually provided. In order that the carriage may be propelled along the cables 3, 4 and 5 trolley wheels 19 and 25 are connected rigidly with driving pulleys 27 and 28 over which belts 29 and 30 are fitted, said belts also passing over other pulleys 31 and 32 rigidly secured to the driving shaft 15. Whenever this driving shaft is rotated the motion will be transmitted to the trolley wheels 19 and 25 and the carriage will be propelled thereby. The shaft 15 is provided with a worm wheel 33 meshing with the worm 34, which worm is rigidly connected with the armature shaft of the motor 35 whereby the worm 34 will be rotated whenever the motor 35 is in motion. The motor 35 receives current from the wires 3, 4 and 5 as indicated in the diagram shown in Figure 9 and hereinafter fully described. The ends 18 and 24 are each provided with downwardly and inwardly extending brackets 36 and 37 (Figure 3) on which the supply cable 38 is mounted, and to which the distributing cable 8 is connected. In addition each of these brackets carries a small shaft 39 to which a round notched member 40 is rigidly secured, and also to which a form of squirrel cage 41 is connected. This squirrel cage structure is provided with end members of any suitable kind, and also with any suitable number of spaced rollers 42 adapted to coact with the trolley wheels 19 and 25 for holding the carriage 6 in place on the trolley wires or cables 3, 4 and 5. The rollers 42 are spaced in order that when the device 41 engages the auxiliary bracket 43 it may rotate on the order of a rack and pinion and thereby pass said auxiliary bracket. This rotation is resisted by a spring 44 secured to the carriage 6 and is normally resting in one of the notches of the notched member 40. The auxiliary brackets 43 are provided at spaced intervals along the wire so that ordinarily member 41 does not rotate, but as soon as any of the rollers 42 strike any of these brackets there will be a partial rotation which will allow the squirrel cage device to pass the bracket and at the same time hold the carriage in place on the supporting wires or cables. The cable 38 carries wires for the cable 8, and the wires from cable 8 with the exception of wire 45 are merely an extension from similar wires in cable 38, while cable 38 carries an additional wire 45 which forms part of the circuit of the solenoid 46 (Figure 9) used in closing the circuit of the motor 35. Whenever the circuit of wire 45 is opened motor 35 will be deprived of current and the carriage 6 will stop as will hereinafter be shown. The wire 45 extends to the end of the bracket 36, but is insulated from said bracket and is connected with an insulated terminal 47, which terminal is normally in continuous engagement with a spring contact 48 carried by a swinging fitting 49 pivotally mounted at 50 on the bracket 36. When the fitting 49 and cable 8 are at the proper angle, as for instance the angle shown in Figure 1, with the carriage 6 substantially opposite the tractor 9, spring 48 will remain in contact with the terminal 47, and consequently the circuit of the solenoid 46 will be closed as wire 45 will be grounded at this point on section 12 of the carriage. This will provide current for maintaining energized the solenoid 46 for maintaining the circuit of the motor 35 closed. However, when the carrage 6 moves forward for a certain distance beyond the tractor 9 the fitting 49 will swing gradually until the springs contact 48 moves off from the terminal 47 whereupon the circuit of the solenoid 46 is open, and said solenoid 46 will therefore be de-energized. A small insulated roller 48' is arranged opposite the juncture of terminal 47 and insulation 47' so that the spring 48 must quickly pass the division line between these two members so as to be positively on one or the other and prevent sparking. The solenoid 46 is maintained energized during the operation of the carriage and consequently holds the switch 52 closed so that whenever the solenoid 46 is deprived of current spring 51 connected with switch 52 will automatically open the switch and thereby deprive the motor 35 of current. In order that there may not be any objectionable sparking spring 48 preferably moves off of the terminal 47 on to an insulated block 47' and remains on said block until the angle of the fitting 49 and the cable 8 has been changed back sufficiently to its former position to cause an engagement of spring 48 with terminal 47. In order to provide a positive stop for the carriage 6 a brake is provided which is formed with a brake-shoe 53 (Figure 4) which is pressed by a spring 54 so as to engage wire 4. A solenoid 55 is provided which acts on the stem 56 of the brake-shoe 53 for withdrawing the same from contact with the wire 4, said withdrawal action being against the action of spring 54. By this structure the brake-shoe is maintained out of engagement with wire 4 as long as current is supplied to the solenoid 55, but as soon as the solenoid is deprived of current the brake shoe will automatically act. The circuit of the solenoid 55 is through the switch 52, and by reason of this fact whenever the motor 35 is deprived of current solenoid 55 will also be deprived of current and consequently the carriage 6 will be stopped almost immediately after the contact spring 48 has moved off of the terminal 47.

In order that the supply cable 8 may be held in proper position and against dragging on the ground a drum or winding reel 57 is provided and located at a suitable point on the tractor 9, said reel being supplied with a supporting shaft 58 journaled in suitable bearings 59 and to which one end of the spring 60 is connected. The opposite end of the spring 60 is connected with the drum 57 and acts on the drum for forming a re-winding action to a certain extent. A rack 61 is rigidly secured to shaft 58 and a pawl 62 is pivotally mounted on one of the brackets 59 and continually engages the annular rack 61 so as to prevent its rotation in one direction. A manually actuated crank 63 is connected to shaft 58 and is provided so that the shaft 58 may be turned in such a direction as to wind the spring 60 which will permit a proper adjustment thereof at any time to cause the same to produce the desired strain on the cable. As the tractor 9 begins to operate near the poles 1 the spring 60 is wound to a certain extent to cause the spring to take up the extra length of cable. In order that the cable may wind properly on the drum 57 an apertured guide 64 is provided through which the cable passes before winding on the drum 57 whereby the angle of the cable as it approaches the drum is never more than a certain angle regardless of the angle of the cable between the guiding eye 64 and the carriage 6. This form of drum will answer the usual requirements for a re-winding drum as the spring 60 automatically re-winds the cable to a limited extent and at the same time permits the cable to be unwound on an emergency and then re-winds after the emergency has passed. If desired an electric motor or other means could be provided for automatically re-winding the spring or directly winding the drum 57.

In Figure 7 will be seen a modified form and arrangement of trolley wires and carriage therefor wherein the pulley or roller 65 is arranged beneath the trolley, and thereby acts as means for holding the other two rollers or pulleys on the remaining wires. Aside from this re-arrangement of the pulleys for holding the carriage in place the construction is identical with the construction shown in Figure 3 and therefore will not need additional description.

In Figure 8 another modified form of the invention is shown which is identical in principle with the construction shown in Figure 3, but arranged in a vertical plane with the upper and lower pulleys or rollers 66 and 67 at an angle almost parallel to the angle at which the cable 8 leaves the carriage. The central pulley 68 is in a vertical plane and is arranged beneath its wire and acts as holding means for holding the other two pulleys 66 and 67 in place.

In Figures 1 to 5 and also Figures 7 and 8 a carriage structure has been presented which will travel along electric supply cables at a desired rate of speed, and at the same time permit a large supply of current to be taken off from the supply cables. In order that a more exact understanding of how the current is distributed from the movable carriage 6 to the movable power using vehicle 9 a diagram is provided in Figure 9 which shows the circuits of the various parts except the detail circuits of the motor and the motor and the circuits in the tractor 9 which may of course, be of any suitable kind. Referring to this figure by numerals, 69 represents a generator at any suitable point for supplying a three phase current through the wires 70, 71 and 72 to the respective wires or trolley cables 3, 4 and 5. In this way the sections 10, 11 and 12 are continually supplied with electricity which is taken therefrom for the motor 35 on the carriage 6 and also for the tractor 9. In tracing the circuit of the motor 35 it may be assumed that current is taken off from the generator 69 by wire 71 and said current will pass to the trolley wire 4 and from thence to trolley wheel 23 to section 11 of carriage 6. From section 11 current will pass from binding post 84 through wire 83, fuse 75′, switch 76′, one of the blades of switch 77, connection 83′, fuse 86, wire 87, one of the binding posts of the reversing switch 88 and from thence to one of the blades of switch 52, wire 90, fuse 81′, switch 82′ to the windings of the motor 35. Current is taken off the generator 69 by a second wire 70 so that the trolley wire 3 is energized and current will pass therefrom through trolley wheel 19 to section 10 of carriage 6 and from said section current will pass through binding post 73, wire 74, fuse 75, switch 76, one of the blades of switch 77, connection 74′, wire 94, fuse 95, one of the binding posts of the reversing switch 88 and through said reversing switch to wire 96, one of the blades of switch 52, wire 97, fuse 81″, switch 82″ and from thence to the winding of the motor 35. As a third arm or branch of the circuit current is taken from the generator 69 by wire 72 and consequently, the trolley wire 5 is energized so that current will be transmitted therefrom through trolley wheel 25 to section 12 of carriage 6. From section 12 current passes through binding post 92, wire 91, fuse 75″, switch 76″, one of the blades of switch 77, connection 91′, wire 93, connection 80, fuse 81, switch 82 and from thence to the winding of motor 35. Three paths have been traced to the motor 35 from the generator 69 and it will be understood that the current will at different times return over these same paths by reason of the way the motor is connected up. For instance, when current is passing from section 10 of the carriage to the motor it may return to section 11 through switch 82′, fuse 81′, switch 52, reversing switch 88, wire 87, fuse 86, connection 83′, switch 76′, fuse 75′, wire 83 and binding post 84. When the current is passing for instance from section 12 to the motor 35, the return current may flow in the path just described to the section 11 and from said section to the wheel 23, from thence through wires 4 and 71 back to the generator 69. It will be noted that the generator is a three phase alternating current generator and, therefore, the direction of flow of the current will reverse quickly so that it only flows in the various paths just described for an instant, and then reverse and flow in a different path in the well known manner of alternating current.

From an examination of these circuits it will be seen that when the various switches have been closed current will freely pass to the motor 35 from the carriage 6 and two wires of the circuit will pass through the reversing switch 88 so that the motor may be reversed at any time, and also at the same two wires which are connected with the reversing switch have continuations 89 and 96 connected with the switch 52 whereby current may be automatically shut off from the motor and also from the solenoid of the brake-shoe 53 whenever contact is broken at terminal 47. In case it should be desired to reverse the travel of the carriage at any time the solenoid 98 is energized and will pull against the hook or shoulder section 99, which acting on the spurred wheel 100 will turn said spurred wheel for a quarter of a revolution and thereby reverse the switch blades of the switch 88. As soon as the solenoid 98 is de-energized the spring 101 will pull the hook or shoulder 99 back to a new position in front of the next tooth of the toothed member 100, said toothed member being formed with four teeth. As this reversing of the switch for causing a rearward or forward movement of the carriage takes place only occasionally, or whenever the operator desires, the energization of the solenoid is caused by a manual closing of the switch 102 arranged on the tractor 9. In tracing the circuit for the solenoid 98, it will be understood that the sections 10, 11 and 12 of the carriage are maintained charged by their connection with the trolley wires which in turn are connected with the alternating current generator 69. With this assumption the current of solenoid 98 may be taken off binding post 92 and when so taken off it will pass through wire 91, fuse 75″, switch 76″, one of the blades of switch 77, connection 91′, wire 93 to the winding of the solenoid 98 and from thence through wire 103, manually actuated switch 102, wire 104, connection 83′, one of the blades of switch 77, switch 76′, fuse 75′, wire 83 to binding post 84 back to section 11. It will be, of course, understood that the switch 102 is closed only momentarily and then opened, which will cause a quick energization of the solenoid 98 and a reversing of the switch 88. Arranged in the circuit of the wires 74, 83 and 91 is the switch 77 having an arm for each wire, said arms being, of course, insulated from each other and connected with the core 105 of the solenoid 106. In case it should be desired at any time to permanently open the circuit of all three of these wires the manually actuated switch 107 on the tractor 9 is closed whereupon current will be supplied to the winding of solenoid 106 for moving the blades of switch 77 to an open position. In tracing the circuit of the solenoid 106 current may be taken off of the section 12 and when taken off of this section it will pass through binding post 92, wire 91, fuse 75″, switch 76″, the winding of solenoid 106, wire 108, manually actuated switch 107, wire 104, connection 83′, one of the blades of the switch 77 which is closed until the circuit has been completed and the solenoid energized, switch 76′, fuse 75′, wire 83 and binding post 84 mounted on section 11 of the carriage 6. After this switch has been opened by manual actuation of switch 107 it cannot be restored except manually. The switch 77 cuts off all of the supply of current both to the motor 35 and the tractor 9, while the switch 52 cuts off only the current to the motor 35 and does this only temporarily. Ordinarily the terminal 47 and contact spring 48 are in engagement, which permits current to pass over wire 74 to wire 78 and from thence through the fuse 79 to the solenoid 46 and back to the wire 45 and the terminal 47, and from the terminal 47 through spring 48 to the section 12 of carriage 6 on which the spring 48 is grounded. In order that the solenoid 55, associated with brake-shoe 53 shall be normally provided with current the terminals of said solenoid are connected by wires 109 and 110 to the respective wires 93 and 90, whereby whenever the motor 35 is deprived of current by the opening of switch 52 the solenoid will be deprived of current and the spring 54 will be permitted to actuate the brake-shoe 53. In tracing the circuit for the solenoid 55 current will be taken off at binding post 92 and will pass through wire 91, fuse 75″, switch 76″, one of the blades of switch 77, connection 91′, wire 93, wire 109, winding of the solenoid 55, wire 110, switch 52, reversing switch 88, wire 87, fuse 86, connection 86′, a second blade or switch 77, switch 76′, wire 83 and contact 84 back to the feed wires. Current for the motor 9′ for the tractor 9 is supplied through wire 104 and wires 111 and 112, said last mentioned wires being connected at 74′ and 91′ respectively to the wires 74 and 91, while the wire 104 is connected at 83′ to wire 83. It will thus be observed that the cable 8 carries five wires, three of which provide power for the tractor and the other two act to control the reversing switch 88 and the throw-off switch 77.

By reason of the circuits provided and the particular construction recited current is continually supplied from the travelling carriage to a travelling vehicle, and means are arranged on the vehicle for automatically taking up the conducting supply cable and for permitting a manual control of certain parts of the mechanism on the carriage while at the same time automatic means are provided for automatically stopping the carriage when moving too fast. The take-up drum or reel 57 is mounted on brackets 59, which brackets may be stationary or may be rotatable in order to cause the guide 64 to point in the same general direction regardless of which way the tractor is moving and whether or not the same has been turned around. During the ordinary operation of the tractor the only work of the operator will be to start and stop the tractor by turning on and off the current and to steer the tractor during the movement thereof as the construction will automatically take care of the remaining work.

What I claim is:

1. The system for the distribution of electrical energy comprising a distributing conductor, a carriage mounted on said conductor and in electrical engagement therewith, electrically operated means mounted on the carriage for moving the carriage, said electrically operated means receiving power from said conductor, a conductor carried by the carriage for distributing electrical power therefrom and means actuated by said last mentioned conductor for controlling the current supplied to said electrically operated means.

2. In a system for the distribution of electrical energy the combination with a vehicle of electric distributing wires, a carriage mounted on said distributing wires, a cable connected with said vehicle and said carriage, one end of said cable being in communication with said wires and the other end connected with a means in the vehicle utilizing electricity, an electric motor in electrical communication with said wires mounted on said carriage and connected up to drive the carriage at substantially the same speed as said vehicle, and means automatically actuated by said cable for depriving said motor of current when the same has moved a predetermined distance ahead of said vehicle.

3. The combination with a moving vehicle using electrical energy of a drum arranged on said vehicle, a plurality of electrical distribution wires, a carriage mounted on said electrical distribution wires, a cable connected with said carriage and in communication with said wires at one end and at the other end connected with said vehicle and wound on said drum, means for causing said drum to re-wind said cable, an electric motor connected with said wires mounted on said carriage, means connected with said motor and engaging said wires for causing the carriage to move along when the motor is operating, and means actuated by the cable when moved to a predetermined angle for shutting off the current to said motor.

4. In a system for the distribution of electrical energy, a plurality of conducting wires, a carriage formed with a plurality of grooved wheels resting on said wires, a driving mechanism for rotating certain of said wheels for propelling the carriage along the wires, an electrically operated motor carried by the carriage and connected by said driving mechanism for operating same, said motor being in electrical communication with said wires, a feed cable extending from said carriage, and means automatically actuated by said feed cable when moved to a certain angle for opening the circuit of said motor.

5. In a system for the distribution of electrical energy, a three phase line of wiring, a carriage having three insulated parts, the respective parts engaging the respective three wires, an electric motor carried by the carriage for propelling said carriage along said wires, and conductors for distributing current from said wires through the carriage while the carriage is standing still and in motion and means actuated by said conductors for opening the circuit of said motor.

6. In a system for the distribution of electrical energy, a series of distributing wires arranged in groups of a number to correspond to the particular number of phases of the electrical energy, a carriage adapted to be arranged on any one of said groups, said carriage being formed in three parts connected together but insulated, a contact roller carried by said carriage for each of the wires supporting the carriage whereby the respective parts of the carriage are energized, a distributing cable connected to the carriage for distributing energy therefrom, an electric motor carried by the carriage, a driving mechanism associated with the motor for driving the rollers in contact with said wires propelling the carriage along the wires whenever the motor is in operation and means actuated by said cable for opening the circuit of said motor.

7. In a system for the distribution of electrical energy, a set of three distributing wires, means for supporting same, a distributing cable, a carriage mounted on said wires carrying one end of said cable, said carriage being provided with an insulated section for each part supporting the carriage, said cable having a strand connected to each part or section of said carriage, a motor carried by said carriage and operatively connected therewith so as to propel the carriage along said wires, a switch actuated by said cable to open and close the circuit of said motor.

8. In a system for the distribution of electrical energy a plurality of wires acting as conductors, means for supporting said wires, said means including brackets, a carriage mounted on said wires provided with traction wheels engaging the wires, means carried by the carriage for rotating certain of said traction wheels for propelling the carriage, a plurality of carriage retaining members mounted on the carriage and adapted to co-act with certain of the wires for preventing said traction wheels from leaving the wires, a cable connected with said carriage in such a manner as to receive current therefrom and a brake carried by the carriage adapted to engage one of said wires when operated for stopping the carriage.

9. In an electric power distributing system a plurality of current carrying wires, a carriage movably mounted on said wires, an electric motor connected with said wires and mounted on said carriage, means operated by the electric motor for moving the carriage, and a swinging contact member swinging in a direction longitudinally of said wires for openng and closing the circuit of said motor.

10. A system for the distribution of electrical energy comprising a plurality of wire conductors, a carriage mounted on said conductors, a motor for propelling the carriage along said wires, a brake-shoe arranged adjacent one of said wires, a spring acting to press said brake-shoe against one of said wires, a solenoid acting when energized to draw said shoe from the wire against the action of said spring, a distributing cable connected with said carriage, and means operated by said cable for opening and closing the circuit of said solenoid.

11. In a distributing system for electrical energy, a plurality of distributing power wires, a carriage formed with a plurality of traction wheels mounted on said wires, a pulley connected with certain of said traction wheels, a cable engaging said pulley, a rotatable member for moving said cable, an electric motor for rotating said rotatable member, said electric motor being electrically connected with said wires a cable having one end connected with said carriage and in electrical communication with said wires, and means actuated by said cable for opening the circuit of said motor.

STEPHEN H. SHARPSTEEN.